(12) United States Patent
Alacqua et al.

(10) Patent No.: US 7,527,329 B2
(45) Date of Patent: May 5, 2009

(54) SEAT, IN PARTICULAR A VEHICLE SEAT, WITH MEANS FOR DEVIATING A VENTILATION FLOW BASED ON COANDA EFFECT

(75) Inventors: Stefano Alacqua, Orbassano (IT); Marco Biasiotto, Orbassano (IT); Andrea Perosino, Orbassano (IT); Gianfranco Innocenti, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 0 days.

(21) Appl. No.: 11/763,882

(22) Filed: Jun. 15, 2007

(65) Prior Publication Data
US 2008/0012398 A1   Jan. 17, 2008

(30) Foreign Application Priority Data
Jul. 11, 2006   (EP) .................................. 06425483

(51) Int. Cl.
A47C 31/00 (2006.01)
(52) U.S. Cl. ................................. 297/180.13
(58) Field of Classification Search ............ 297/180.13, 297/180.14, 180.1, 452.42
See application file for complete search history.

(56) References Cited
FOREIGN PATENT DOCUMENTS

| EP | 407362 A1 * | 1/1991 |
|---|---|---|
| EP | 411375 A1 * | 2/1991 |
| EP | 1088696 A2 | 4/2001 |
| EP | 1382472 A1 | 1/2004 |
| EP | 1544006 A1 | 6/2005 |
| EP | 1544007 A1 | 6/2005 |
| WO | 2004065149 A1 | 8/2004 |
| WO | 2005105516 A2 | 11/2005 |

OTHER PUBLICATIONS

European Search Report for EP 06425483 dated Dec. 21, 2006.

* cited by examiner

*Primary Examiner*—Milton Nelson, Jr.
(74) *Attorney, Agent, or Firm*—Heslin Rothenberg Farley & Mesiti P.C.; Victor A. Cardona

(57) ABSTRACT

A vehicle seat comprises at least one passage for a heating or conditioning air flow and a flow deviating device associated to the seat to control the flow of air through such passage. The flow deviating device comprises at least one Coanda effect deviating device. In the case of application to the front seat of a car, the passage internal to the seat for the ventilation air flow has an upstream end communicating with an air supplying duct, and a downstream end communicating with a discharge duct whose outlet opens at the rear of the seat, to ventilate the rear part of the car passenger compartment. Said passage inside the seat is formed on the surface of the seat padding in the area of contact with the user's body, immediately below the cover of the padding. The discharge duct is arranged such that the flow of air through the passage carries out a flushing action of the area of contact with the user's body and is not forced to flow substantially through the cover.

5 Claims, 5 Drawing Sheets

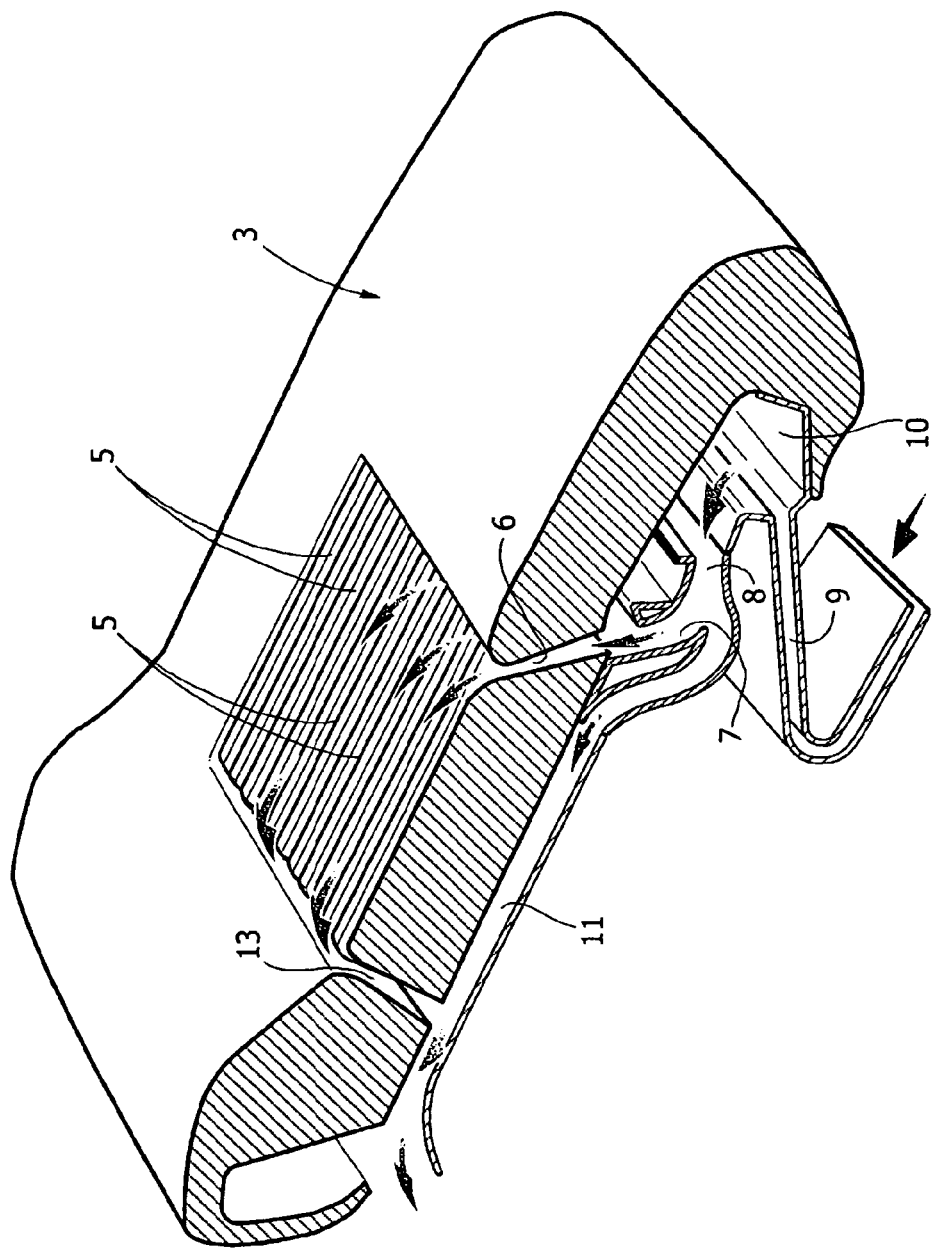

SEAT, IN PARTICULAR A VEHICLE SEAT, WITH MEANS FOR DEVIATING A VENTILATION FLOW BASED ON COANDA EFFECT

CROSS REFERENCE TO RELATED APPLICATIONS

This application claims priority from European Patent Application No. 06425483.2, filed on Jul. 11, 2006, the entire disclosure of which is incorporated herein by reference.

BACKGROUND OF THE INVENTION

The present invention relates to seats and was developed with particular reference to vehicle seats, such as for example seats of cars, lorries and buses, or seats for railway vehicles, aeroplanes or ships.

SUMMARY OF THE INVENTION

The invention concerns in particular seats of the type equipped with at least one passage for a flow of heating or conditioning air and with flow deviating means associated to the seat, for controlling the air flow through this passage.

The purpose of the invention is to provide an innovative seat, which is characterised by an extremely simple system for controlling a ventilation flow therethrough, and which has reduced dimensions and is efficient and reliable in operation.

In view of achieving this purpose, the invention is directed to a seat of the above-indicated type, characterised in that the flow deviating means comprises at least one flow deviating device operating by the Coanda effect.

The Coanda effect has been discovered and long studied. It is the effect for which a fluid flow freely entering into a larger chamber, in adjacency to one lateral wall thereof, tends to adhere to this wall. By exploiting this principle, the Applicant has developed numerous applications and devices operating by the Coanda effect, in particular in systems for the distribution of air within vehicles (see for example EP-A-1 585 642, EP-A-1 544 006, and EP-A-1 544 007).

The main advantage of air deviating devices operating by the Coanda effect consists in their greater efficiency, due to the fact that the flow is not subjected to resistance and its speed and flow rate are not decreased, since the device has no deflection shutters to deflect the flow. Furthermore, Coanda effect deviating devices are of extremely simple construction and can be controlled with actuators having a very low energy consumption.

The idea underlying the present invention is essentially that of associating a Coanda effect deviating device to a seat, particularly but not exclusively any type of vehicle seat, to control the ventilation air flow within the seat.

In a preferred embodiment, the Coanda effect deviating device comprises a main inlet duct for the air flow and at least two secondary ducts that branch from the main duct, as well as at least one control member associated to a wall of the main duct that can be displaced between a first position, in which the flow coming from the main duct tends to adhere, due to the Coanda effect, to a wall of the main duct that extends into a wall of a first secondary duct, whereby all of the air flow is deviated into the first secondary duct, and a second position, in which the flow tends to detach itself from said wall and to adhere, again due to the Coanda effect, to an opposite wall of the main duct that extends into a wall of the second secondary duct, in such a way that the entire flow is deviated into this second secondary duct.

According to a further preferred feature, the seat, for example a car seat, comprises, in a known manner, a frame, a padding, for example of foamed plastic material, supported by the frame, and a breathable cover applied onto the padding. The body of the padding presents one or more passages to convey the air along the surface of the padding immediately below the cover, in the area of contact with the user's body. These passages communicate at their upstream end with the inlet duct of the ventilation flow, and at their downstream end with a discharge duct. In the case for example of a front seat of a car, the inlet duct branches from a first duct through which heating or conditioning air is directed by the vehicle air distribution system towards the rear part of the passenger compartment. In this case, the Coanda effect deviating device according to the invention is situated at the branch of the inlet duct for the seat ventilation flow from the duct that conveys the air conditioning flow to the rear part of the passenger compartment. By the Coanda effect deviating device it is possible to deviate the flow into the inlet duct, so as to supply an air flow through the passage within the seat. Since this passage communicates at its downstream end with a discharge duct, the ventilation flow is not forced to pass mainly through the cover, but rather performs simply a flushing action of the zone of the seat in contact with the user's body, and is then discharged through the discharge duct.

In another embodiment of the invention, the Coanda effect deviation device is applied to a seat, for example a railway seat, to distribute the flow of air to one or more air vents situated for example at the lower part of the seat and in the area of the arm rests.

BRIEF DESCRIPTION OF THE DRAWINGS

Further characteristics and advantages of the invention will appear from the following description, with reference to the annexed drawings, provided by way of non-limiting example, in which:

FIG. 4 is a perspective view, in partial section, of the padding of the cushion of the seat according to the invention.

DETAILED DESCRIPTION OF THE INVENTION

Figure 1:
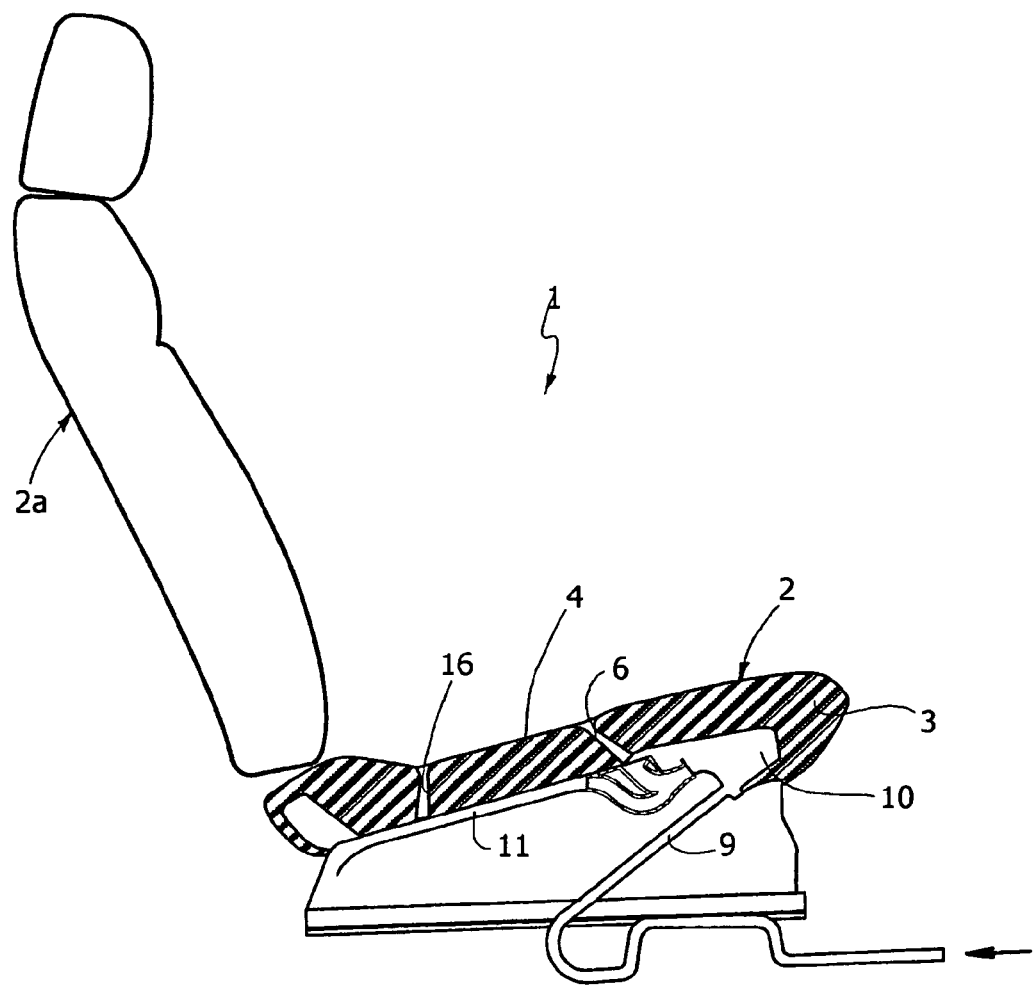
FIG. 1 is a diagrammatic cross-sectional view of a car seat made in accordance with the teachings of the present invention.
Figure 2:
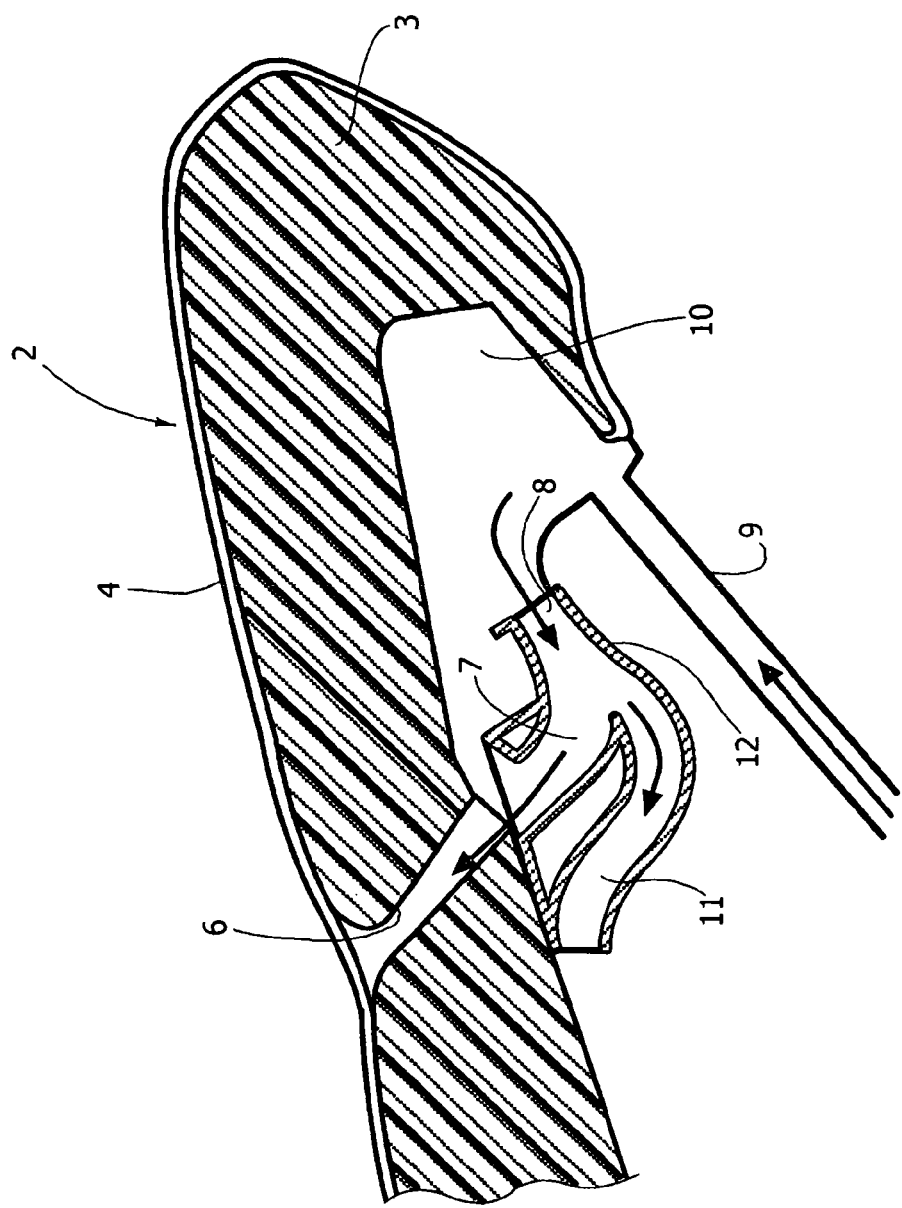
FIG. 2 illustrates a detail of FIG. 1 at an enlarged scale.

In FIG. 1, numeral 1 generally designates a front seat of a car, comprising a cushion 2 and a backrest 2a.

The cushion 2 comprises, in a known manner, a metal frame (not visible in the drawing) on which is supported a body 3 of foamed plastic material of a padding covered by a cover 4, this cover preferably comprising a breathable material or a material able to permit the passage of air through it.

As may be seen in FIG. 4, the body 3 of foamed plastic material is shaped with a plurality of longitudinal grooves 5 flush with the upper surface of the body 3 that communicate at their end towards the front part of the seat with a single passage 6 that in its turn communicates with an inlet duct 7 that branches off a main duct 8. The duct 8 receives a ventilation air flow from the vehicle air conditioning system through a duct 9 flowing into a chamber 10 to which is connected the main inlet duct 8. Beyond the branch 7 the main duct 8 is prolonged to become a further secondary duct 11 which extends beneath the padding of the seat and has its outlet at the rear part of the cushion, to feed a ventilation air flow to the rear part of the passenger compartment.

The ends of the grooves 5 towards the rear part of the cushion communicate with a single passage 13 that flows into the duct 11.

At the inlet duct 8, a Coanda effect deviation device is located that is capable of distributing a flow of air from the duct 9 between the first secondary duct 7 and the second secondary duct 11. When the flow of air is deviated into the duct 7, it reaches the grooves 5 and performs a flushing function of the area of the seat in contact with the user's body. Note that an important characteristic of this solution lies in the fact that the ventilation flow passages discharge back into the duct 11, so that the ventilation air flow is not forced to pass through the cover fabric or material and does not create counter-pressure at the upstream end of the system.

The Coanda effect deviating device situated at the inlet duct 8 can be made in conformity with the teachings disclosed in the prior patents of the applicant that have been identified above. In the example illustrated, this device comprises a wall section 12 that is incorporated into a wall of the inlet duct 8 that extends into a wall of the duct 11. The wall section 12 is pivotally connected at 12a to the remaining part of the wall of the duct and can be displaced, through actuating devices of any type, between a first position (illustrated in the drawings), in which the inner surface of the wall section 12 is flush with the inner surface of the adjacent portion of wall, and a second position, illustrated in the drawings with a dotted line, in which the wall section 12 projects inwards into the duct 8.

Figure 3A:
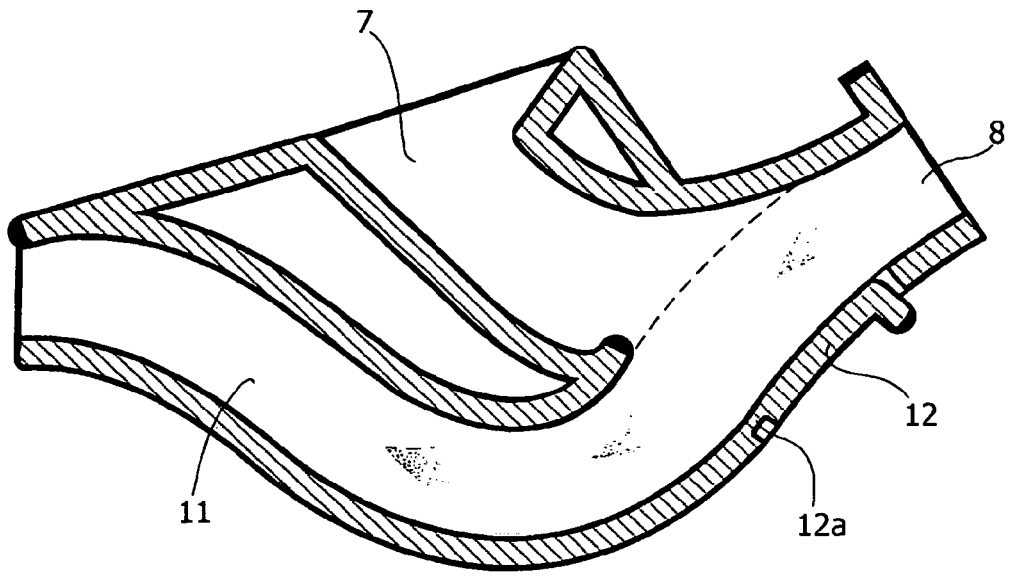
FIGS. 3A and 3B illustrate a detail of FIG. 2 at an enlarged scale.
Figure 3B:
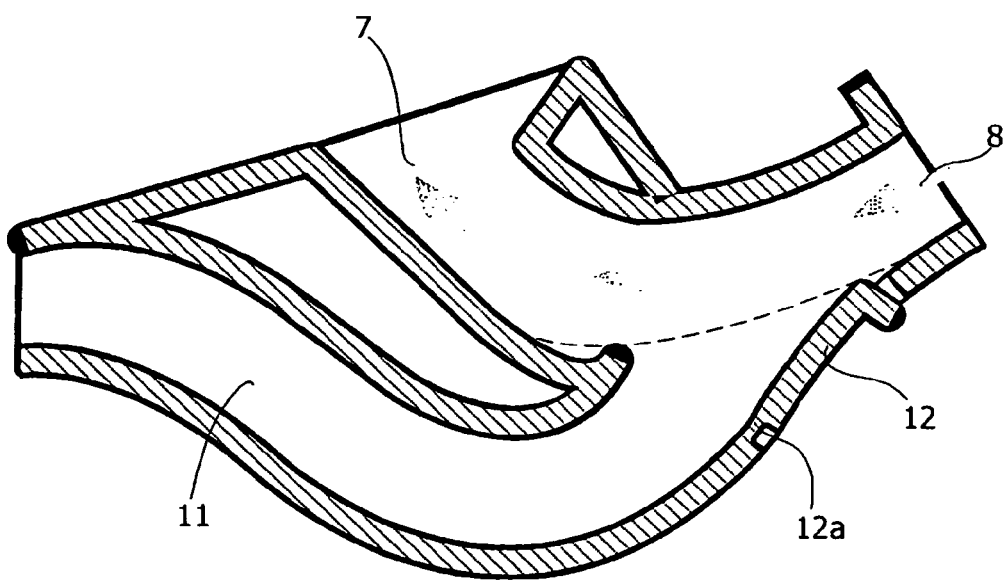

In the first position, the flow of air that enters through the inlet duct 8 tends to adhere to the wall incorporating the wall section 12 and is thus deviated into the duct 11. When the wall section 12 is brought into its position projecting within the duct 8, the flow detaches from that wall and tends to adhere, again through the Coanda effect, to the opposite wall of the duct 8 in such a manner that the entire flow is deviated into the duct 7 (FIG. 3b). The means actuating the wall section 12 may consist of any type of electromechanical or fluid actuator. A particularly preferred solution is that of a shape memory actuator.

Figure 5:
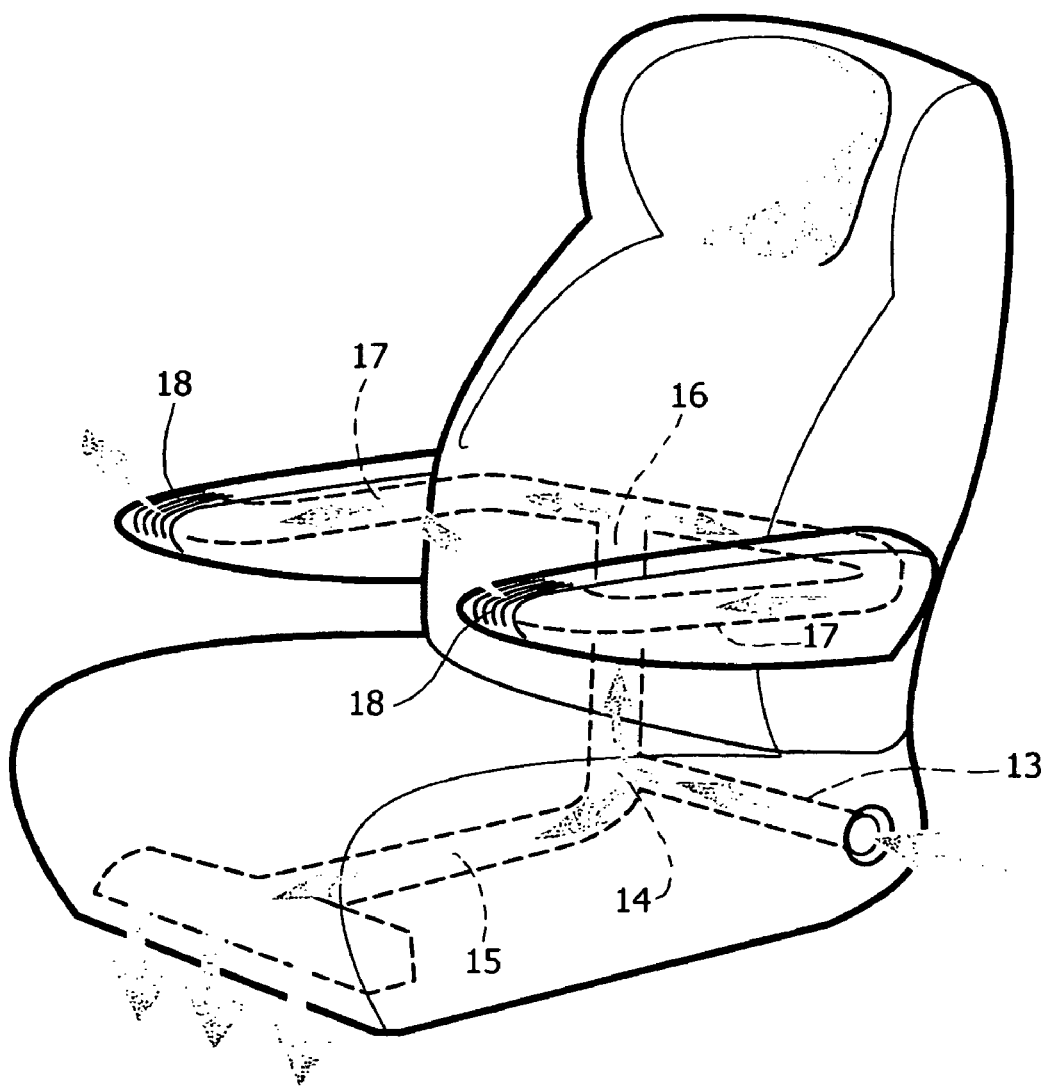
FIG. 5 illustrates in perspective view another embodiment of the seat according to the invention which is for use on a railway vehicle.

FIG. 5 illustrates the case of a railway seat in which downstream of an inlet duct 13 for a ventilation air flow there is a branch 14, whereby such flow may be deviated into a duct 15 having its outlet below the seat, or into a duct 16 which branches into two ducts 17 leading to vents 18 on the front part of each of the two armrests of the seat. A Coanda effect deviating device, for example of the type illustrated in FIGS. 3a and 3b, is situated at the branch 14.

As is clear from the present description, the application of a Coanda effect deviating device to the distribution of air in a seat makes it possible to achieve advantages of simplicity, reduced size, efficiency and reliability compared to known solutions.

The invention has been described above with reference to a car seat or a railway seat, but it is capable of application on any other type of transportation means, such as aeroplanes, boats or ships, as well as to seats for buildings in general, such as houses, offices, theatres, stadiums, etc.

Naturally, while the principle of the invention remains the same, the construction details and the embodiments may be widely varied with regard to what is described and illustrated here by way of example, without thereby departing from the scope of the present invention.

The invention claimed is:

1. A vehicle seat, comprising:
at least one passage for heating or conditioning air;
deviating means associated to the seat to control a flow of air through said at least one passage, wherein said deviating means includes at least one deviating device operating by Coanda effect;
wherein said deviating device includes a main inlet duct, at least two secondary ducts that branch off the main duct, and a Coanda effect control member, associated with at least one wall of the inlet duct and displaceable between a first position, in which the flow from the inlet duct adheres due to the Coanda effect to a wall of the inlet duct that extends into a wall of a first of said secondary ducts, whereby the flow of air is deviated into said first secondary duct, and a second position, in which the flow detaches from said wall and adheres, due to the Coanda effect, to an opposite wall of the inlet duct that extends into a wall of the second secondary duct, in such a way that the flow is deviated into said second secondary duct; and
wherein said at least one passage includes a plurality of grooves formed in an upper surface of a body of a padding of a cushion of the seat, immediately adjacent to a cover of the padding, each of said plurality of grooves communicating at upstream ends thereof with said inlet duct and communicating at downstream ends thereof with a discharge duct inside the seat or associated to the seat, in such a manner that the flow of air through said plurality of grooves performs a flushing function of an area of the seat configured to contact a user's body, without substantially passing through the cover of the seat.

2. The seat according to claim 1, wherein said Coanda effect deviating device is integrated into a structure of the seat to distribute a ventilation air flow among a number of ducts having different vents.

3. The seat according to claim 1, wherein said inlet duct communicates with an air supply duct supplying a ventilation air flow originating from a heating or conditioning air device, said at least one passage for the ventilation air flow provided in the seat communicates with said first secondary duct, and said first secondary duct extends beneath the seat and has its outlet at the rear part of the seat.

4. The seat according to claim 3, wherein the seat comprises a front seat of a car having a heating or air conditioning device, said air supply duct capable of being connected to said heating or air conditioning device and said first secondary duct having an outlet opening into the car passenger compartment to ventilate the rear part of the passenger compartment.

5. The seat according to claim 3, wherein said discharge duct communicating with the grooves formed in the padding of the seat flows into said first secondary duct.

* * * * *